United States Patent
Hiroe et al.

(10) Patent No.: US 11,124,231 B2
(45) Date of Patent: Sep. 21, 2021

(54) VEHICLE

(71) Applicant: TOYOTA JIDOSHA KABUSHIKI KAISHA, Toyota (JP)

(72) Inventors: Yoshihiko Hiroe, Toyota (JP); Masaki Okamura, Toyota (JP); Kensuke Yoshizue, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 16/535,308

(22) Filed: Aug. 8, 2019

(65) Prior Publication Data

US 2020/0189656 A1 Jun. 18, 2020

(30) Foreign Application Priority Data

Dec. 17, 2018 (JP) .............................. JP2018-235715

(51) Int. Cl.
*B62D 7/14* (2006.01)
*B60Q 1/34* (2006.01)
*B60Q 1/50* (2006.01)

(52) U.S. Cl.
CPC ................. *B62D 7/14* (2013.01); *B60Q 1/34* (2013.01); *B60Q 1/503* (2013.01)

(58) Field of Classification Search
CPC ............. B62D 7/14; B60Q 1/34; B60Q 1/503
See application file for complete search history.

(56) References Cited

U.S. PATENT DOCUMENTS

| | | | | |
|---|---|---|---|---|
| 5,482,125 A | * | 1/1996 | Pagett | A61G 5/042 180/6.32 |
| 9,953,538 B1 | | 4/2018 | Matthiesen et al. | |
| 10,807,520 B1 | * | 10/2020 | Berry | B60Q 1/343 |
| 10,814,778 B2 | * | 10/2020 | Lee | B60Q 1/50 |
| 10,857,849 B2 | * | 12/2020 | Toyoda | B60G 17/0416 |
| 10,913,389 B2 | * | 2/2021 | Aust | B60Q 1/50 |
| 2010/0181135 A1 | * | 7/2010 | Sbarro | B62D 7/14 180/253 |
| 2015/0134202 A1 | * | 5/2015 | Dawson | B62D 6/007 701/41 |
| 2016/0207449 A1 | * | 7/2016 | Noble | B60Q 1/34 |
| 2016/0288828 A1 | * | 10/2016 | Ohba | B62D 7/1509 |
| 2017/0240098 A1 | | 8/2017 | Sweeney et al. | |
| 2020/0102004 A1 | * | 4/2020 | Yamazaki | B60T 8/172 |

FOREIGN PATENT DOCUMENTS

JP 2012-232713 A 11/2012
JP 2014-075867 A 4/2014

* cited by examiner

*Primary Examiner* — Albert K Wong
(74) *Attorney, Agent, or Firm* — Oliff PLC

(57) ABSTRACT

Provided is a vehicle including a plurality of wheels, a steering device, and a direction indication system. The steering device is configured to steer the wheels at least either to such a first steering angle that the vehicle travels straight in a direction intersecting the front-rear direction or to such a second steering angle that the vehicle rotates around a vertical axis passing through a central portion of the vehicle body. The direction indication system is configured to, when the steering device steers the wheels to either the first steering angle or the second steering angle, indicate toward the outside of the vehicle body that the vehicle is going to travel straight in a direction intersecting the front-rear direction or that the vehicle is going to rotate around the vertical axis passing through the central portion of the vehicle body.

9 Claims, 5 Drawing Sheets

ON-THE-SPOT ROTATION

LATERAL TRAVEL

ON-THE-SPOT ROTATION

OBLIQUE TRAVEL

VEHICLE

INCORPORATION BY REFERENCE

The disclosure of Japanese Patent Application No. 2018-235715 filed on Dec. 17, 2018 including the specification, drawings and abstract is incorporated herein by reference in its entirety.

BACKGROUND

1. Technical Field

The present disclosure relates to a vehicle of which all the wheels can be steered, particularly to a vehicle equipped with a device that can steer all the wheels so as to cause the vehicle to travel laterally or rotate on the spot.

2. Description of Related Art

Common four-wheel vehicles are configured such that steering wheels (usually front wheels) supported by a suspension are steered by a steering linkage. Since the steering wheels when steered may interfere with the steering linkage etc., the steering angles of the steering wheels are mechanically limited. In contrast, for example, the small vehicle described in Japanese Patent Application Publication No. 2012-232713 includes a steering actuator for each wheel, and is configured to allow each wheel to be steered to about 90 degrees or larger angles. Equipped with such a special steering device, this type of vehicle can travel laterally with all the wheels steered to 90 degrees relative to the front-rear direction of the vehicle. Moreover, when four wheels are disposed at positions corresponding to four corners of a square, steering the left front wheel and the right rear wheel to 45 degrees rightward (clockwise) as seen from above the vehicle, and steering the right front wheel and the left rear wheel to 45 degrees leftward (counterclockwise) as seen from above the vehicle, can set an instantaneous center of motion of the rotating wheels at a central portion of the vehicle body, which allows the vehicle to rotate around this instantaneous center (perform a so-called on-the-spot rotation). Simply put, the steering angle of a wheel when the vehicle rotates on the spot is an angle at which the wheel orthogonally intersects a line connecting the center of rotation and the center of the wheel to each other.

SUMMARY

Common or most vehicles are vehicles having front wheels as steering wheels, and travel in a straight line (travel straight) in the front-rear direction thereof. To change the direction of travel, these vehicles turn (make a circular motion) around a point of intersection between a line that is drawn perpendicularly from a grounded point of the steered front wheel to a plane of rotation of the front wheel and a line that is extended from the axle of the rear wheel. The structures of roads, parking lots, etc. and traffic rules are built on the assumption of such a manner of traveling of vehicles, and of course, not only drivers but also pedestrians are accustomed to such a manner of traveling of vehicles and act accordingly.

Therefore, behaviors of a vehicle such as a lateral travel, on-the-spot rotation, and straight travel in an oblique direction (oblique travel) described above are unpredictable to drivers and passengers of surrounding vehicles or pedestrians. Smooth and safe operation of vehicles is realized by vehicles and pedestrians moving in a coordinated manner, which is premised on the assumption that the movement of each vehicle and each pedestrian is predictable. To this end, vehicles are equipped with direction indicators (right and left blinkers), backup lights, hazard lights, etc., and it is usual practice for a driver to let those around the vehicle know about the behavior of the vehicle by manipulating these devices.

However, travels or behaviors such as a lateral travel, on-the-spot rotation, and straight travel in an oblique direction described above are those that a vehicle having either front or rear wheels as steering wheels cannot perform. This means that even when the driver of such a special vehicle turns on the direction indicator, behaviors such as a lateral travel, on-the-spot rotation, and oblique straight travel are still unpredictable to nearby vehicles, including oncoming vehicles and vehicles traveling side by side with the special vehicle. Therefore, even when the drivers of the nearby vehicles, on seeing the direction indicator etc., manipulate their vehicles so as to avoid collision, this collision-avoiding manipulation may not be adapted for a lateral travel, on-the-spot rotation, oblique straight travel, etc. Then, those vehicles would rapidly approach the special vehicle or the drivers of those vehicles would have to apply the brakes suddenly, which could consequently hinder smooth and safe operation of vehicles on the road. Moreover, since a lateral movement, on-the-spot rotation, oblique straight travel, etc. are movements that are unpredictable to pedestrians, such travels or behaviors could surprise or frighten pedestrians.

The present disclosure provides a vehicle equipped with a special steering device that allows the vehicle to perform so-called special travels, such as a lateral travel and an on-the-spot rotation, and capable of ensuring smooth and safe operation of vehicles even when traveling among other vehicles that have either front or rear wheels as steering wheels.

A vehicle according to one aspect of the present disclosure includes a plurality of wheels, a steering device, and a direction indication system. The wheels are mounted to a vehicle body and configured to be grounded. The steering device is configured to steer the wheels to such a steering angle that the vehicle travels straight in a front-rear direction of the vehicle, and additionally to steer the wheels at least either to such a first steering angle that the vehicle travels straight in a direction intersecting the front-rear direction or to such a second steering angle that the vehicle rotates around a vertical axis passing through a central portion of the vehicle body. The direction indication system is configured to, when the steering device steers the wheels to either the first steering angle or the second steering angle, indicate toward the outside of the vehicle body that the vehicle is going to travel straight in a direction intersecting the front-rear direction or that the vehicle is going to rotate around the vertical axis passing through the central portion of the vehicle body.

In the vehicle according to one aspect of the present disclosure, the direction indication system may include a detection unit that detects that the steering device steers the wheels to the first steering angle or the second steering angle, and an indication unit that optically or acoustically indicates to those around the vehicle body that the vehicle is going to travel straight in a direction intersecting the front-rear direction or that the vehicle is going to rotate around the vertical axis passing through the central portion of the vehicle body.

In the vehicle according to one aspect of the present disclosure, the steering device may be configured to rotate each of the wheels around a rotational central axis to the first steering angle or the second steering angle. The detection unit may be configured to detect that the wheels are steered to the first steering angle or the second steering angle, based on rotation angles of the wheels rotated around the rotational central axis.

The vehicle according to one aspect of the present disclosure may further include a manipulation unit that is manipulated by a driver to output a signal ordering the steering device to steer the wheels to the first steering angle or the second steering angle. The detection unit may be configured to detect that the steering device steers the wheels to the first steering angle or the second steering angle, based on the manipulation unit having been manipulated and output the signal.

The vehicle according to one aspect of the present disclosure may further include a wheelhouse that covers at least the upper side of the wheel. The wheelhouse may be configured such that when the steering device steers the wheel to the first steering angle or the second steering angle, the wheel partially protrudes from the wheelhouse to the outside of the vehicle body. The detection unit may be configured to detect that the steering device steers the wheel to the first steering angle or the second steering angle, based on the wheel having partially protruded from the wheelhouse to the outside of the vehicle body.

In the vehicle according to one aspect of the present disclosure, the indication unit may include a light emitter that emits visible light to the wheels when the detection unit has detected that the steering device steers the wheels to the first steering angle or the second steering angle.

In the vehicle according to one aspect of the present disclosure, the indication unit may include blinkers that are provided on right and left sides of the vehicle body and configured to flash when the vehicle is going to travel in a direction different from that when the vehicle travels straight forward. The indication unit may be configured to control the blinkers such that an aspect of flashing of the blinkers when the vehicle is going to turn in an arcuate line around a center of turning that is set outside the vehicle body, and an aspect of flashing of the blinkers when the vehicle is going to travel straight in a direction intersecting the front-rear direction or when the vehicle is going to rotate around the vertical axis passing through the central portion of the vehicle body, are different from each other.

In the vehicle according to one aspect of the present disclosure, the blinkers may be sequential blinkers in each of which a plurality of flashing parts is arranged in a straight line or a curved line and the flashing parts flash in predetermined order. The aspect of flashing of the blinkers may include the order of flashing of the flashing parts.

In the vehicle according to one aspect of the present disclosure, the indication unit may include a display part that displays, on an outer surface of the vehicle body, a text or an image representing a direction in which the vehicle is going to travel as a result of the steering device having steered the wheels to the first steering angle or the second steering angle.

When the vehicle according to the present disclosure is going to behave differently from when only the front wheels or the rear wheels are steered, such as when the vehicle is going to travel in a lateral direction, travel straight in an oblique direction, or rotate on the spot, the direction indication system can let those around the vehicle know about such a special behavior or travel. Thus, this vehicle allows the drivers of other vehicles or pedestrians nearby to predict the direction of travel of the vehicle, and can ultimately contribute to smooth and safe operation of vehicles on the road.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
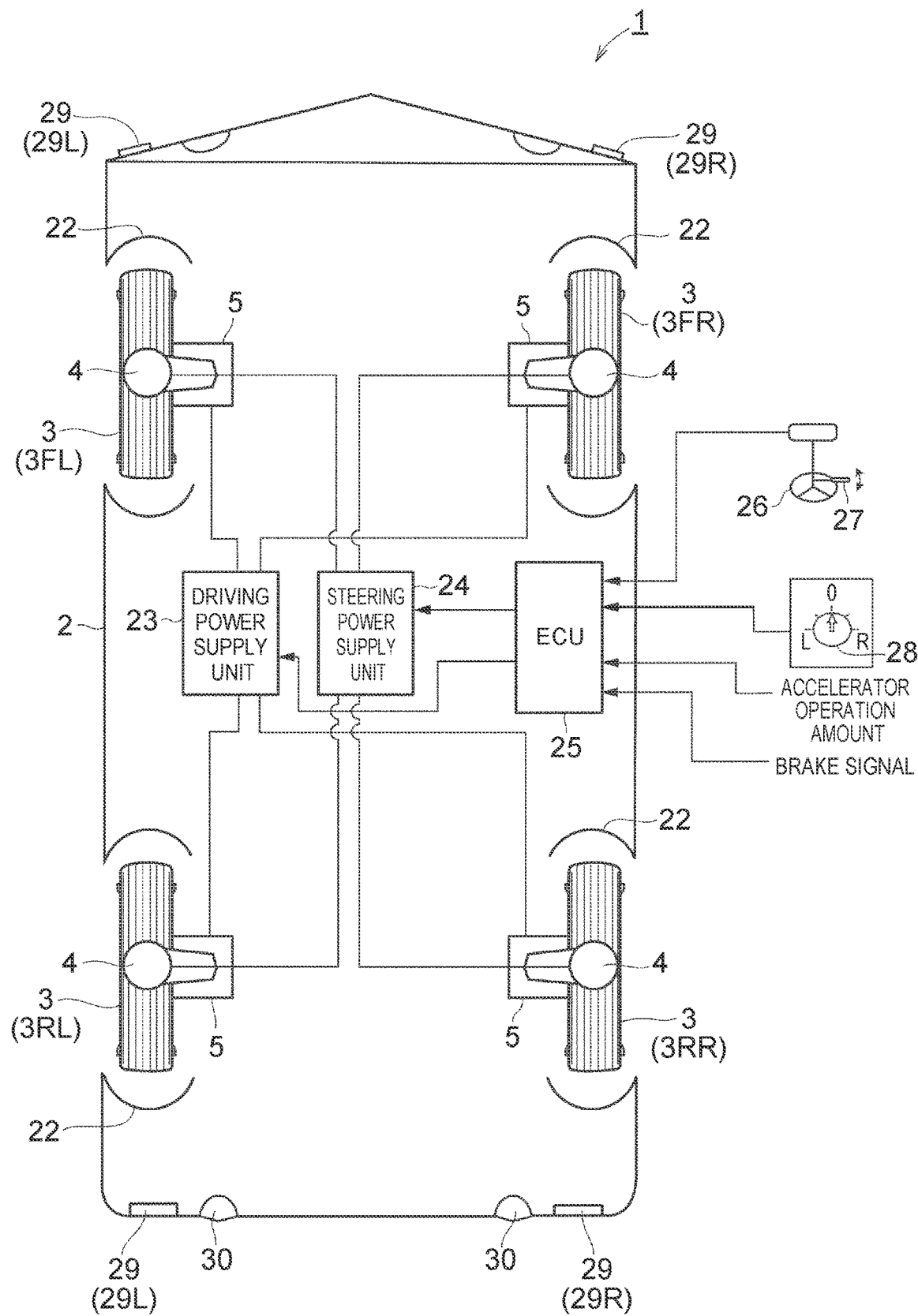
FIG. 1 is a schematic view of a vehicle in an embodiment of the present disclosure.

A vehicle 1 in an embodiment of the present disclosure is a vehicle capable of traveling straight in a lateral direction orthogonal to a front-rear direction thereof or in a direction intersecting with the front-rear direction at a predetermined angle, as well as of rotating without moving in the front-rear direction or the lateral direction. To achieve this, as shown in FIG. 1, the vehicle 1 includes steering devices 4 that can steer all wheels 3 mounted to a vehicle body 2 to an equal angle. Here, along the front-rear direction of the vehicle, a direction which a driver faces in a state of sitting on a seat (neither the driver nor the seat is shown) is a forward direction, and the opposite direction is a backward direction. Hereinafter, a travel in a direction orthogonal to the front-rear direction of the vehicle will be referred to as a "lateral travel." A straight travel in a direction intersecting the front-rear direction of the vehicle at a predetermined angle is a travel in which the vehicle travels in a straight line, i.e., such that the vehicle body 2 has a straight motion trajectory, in a direction oblique to the vehicle body 2, with the vehicle body 2 kept oriented in the front-rear direction, and this travel will be hereinafter referred to as an "oblique travel." Further, a behavior of rotating without the vehicle body 2 moving in the front-rear direction or the lateral direction is a rotation around a vertical axis (an axis perpendicular to a road surface) passing through a predetermined portion of the vehicle body 2, and this rotation will be hereinafter referred to as an "on-the-spot rotation." As shown in FIG. 1, in the vehicle 1 having four wheels 3, the center of an on-the-spot rotation is located at the position of the geometric center of gravity of the four wheels 3, more specifically at a point of intersection between lines each connecting diagonally opposite wheels 3 to each other.

The steering device 4 provided for each wheel 3 is configured to be capable of steering the wheel 3 to at least 90 degrees to allow for a lateral travel, oblique travel, and on-the-spot rotation described above. Here, a steering angle is an angle to which the wheel 3 is steered from a direction orthogonal to an axis passing through the center of the wheel 3 in a width direction of the vehicle 1, i.e., from the front-rear direction of the vehicle. For example, the direction of steering of the right front wheel and the left rear wheel is leftward (a counterclockwise direction) in a top-down view of the vehicle body 2, and that of the right rear wheel and the left front wheel is rightward (a clockwise direction) in a top-down view of the vehicle body 2. The steerable angle may be 90 degrees in each of the counterclockwise direction and the clockwise direction, and thus 180 degrees in total.

Figure 2:
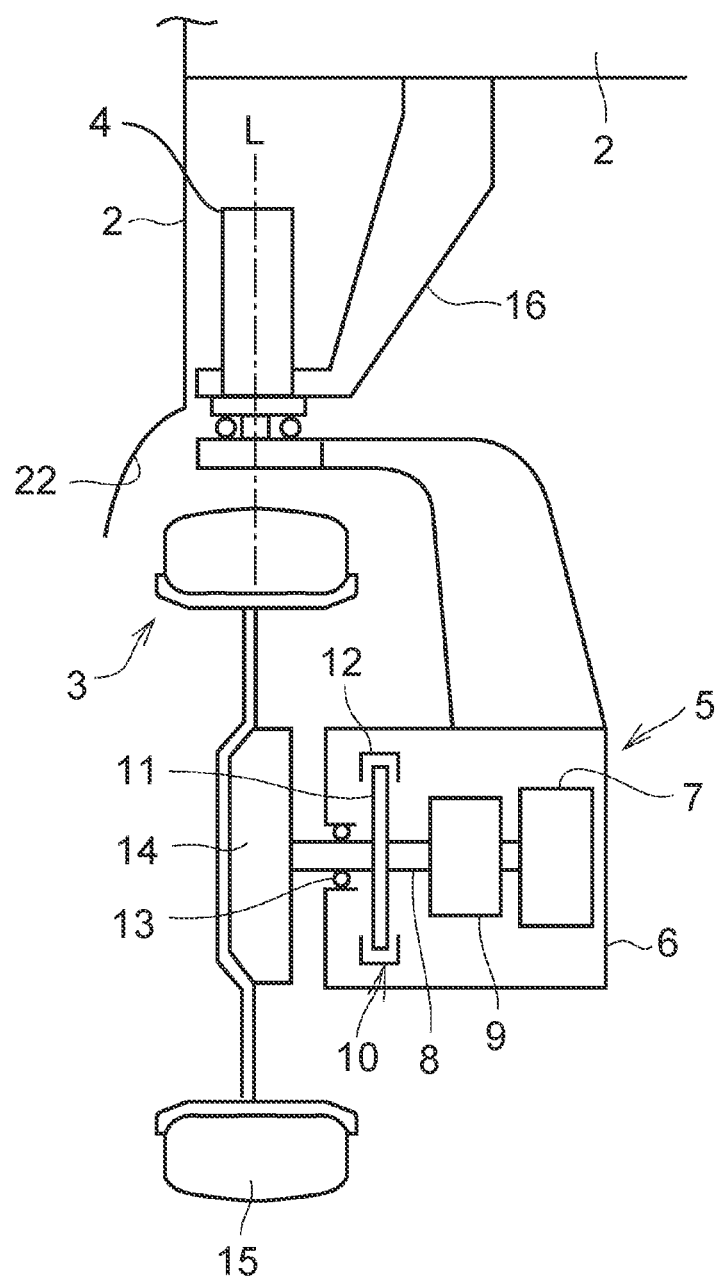
FIG. 2 is a schematic view showing a driving unit and a steering device for one wheel.

Since the steering angle is set to such a large angle, or to allow for such a large steering angle, a driving unit 5 including a driving mechanism and a braking mechanism are provided for each wheel 3. Thus, the vehicle 1 in this embodiment of the present disclosure can be called a type of in-wheel motor vehicle (IWM). FIG. 2 is a schematic view illustrating an example of the driving unit 5 and the steering device 4. Inside a casing 6 of the driving unit 5, a motor 7 that outputs torque for traveling, a speed reducing mechanism 9 that amplifies the torque of the motor 7 and transmits the amplified torque to an output shaft 8, and a braking mechanism 10 are housed. To regenerate energy during deceleration, the motor 7 is formed by a motor-generator having an electricity generating function, such as a permanent-magnet synchronous electric motor. The speed reducing mechanism 9 is provided to downsize the motor 7, i.e., to make it possible to use a low-torque high-speed motor, and for example, a planetary-gear speed reducing mechanism that can be disposed coaxially with the motor 7 is adopted as the speed reducing mechanism 9. Such a speed reducing mechanism can be fixed by coupling the sun gear to the motor 7, the carrier to the output shaft 8, and the ring gear to a predetermined fixing part. Alternatively, the speed reducing mechanism 9 may be a so-called multi-shaft speed reducer with a plurality of gears meshing with one another.

The braking mechanism 10 may be any mechanism that can apply torque to the output shaft 8 in a direction of stopping the rotation of the output shaft 8, and one example is a friction brake. In the example shown in FIG. 2, the braking mechanism 10 is configured to prevent the rotation of the output shaft 8 through frictional force by clamping a disc 11, mounted on the output shaft 8, with a caliper 12. An actuator that drives the caliper 12 may be a hydraulic actuator, but an electromagnetic actuator may also be used. Adopting an electromagnetic actuator can reduce the number of members interfering with the wheel 3 and also simplify the configuration.

In a state of being rotatably supported on the casing 6 through a bearing 13, the output shaft 8 protrudes from the casing 6. A wheel hub 14 is provided at a protruding leading end of the output shaft 8, and a tire 15 is mounted to the wheel hub 14.

Figure 3:
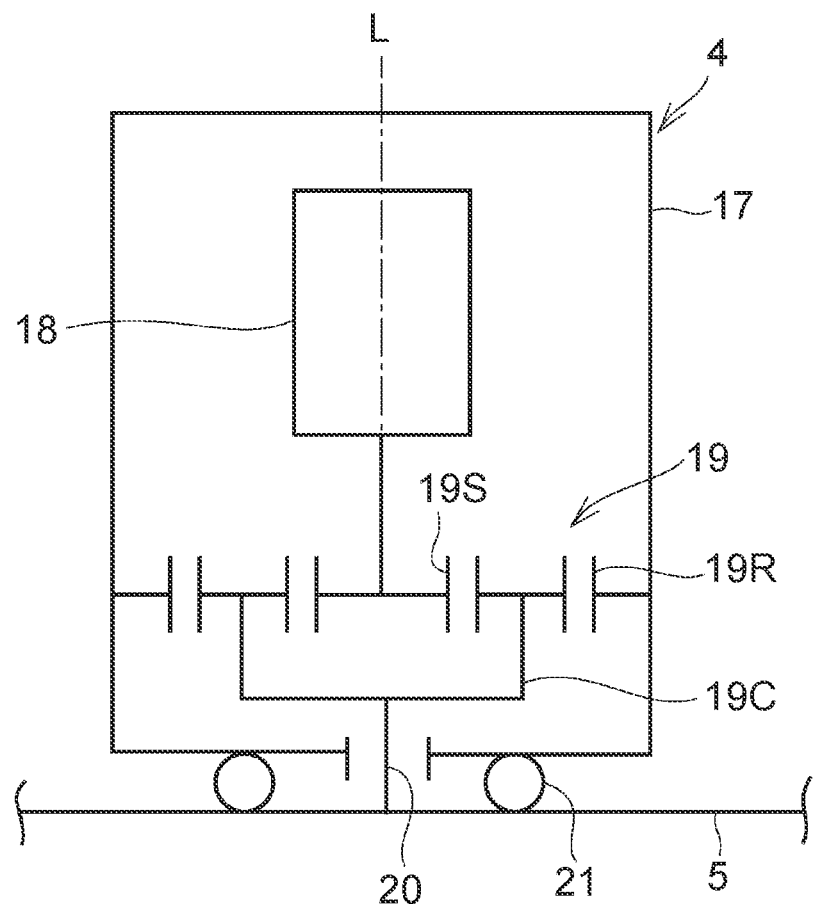
FIG. 3 is a skeleton diagram showing an example of the mechanism inside the steering device.

The driving unit 5 is mounted to the steering device 4, and the steering device 4 is mounted to the vehicle body 2 through a suspension arm 16. Thus, the driving unit 5 is supported by the vehicle body 2, and the wheel 3 is mounted to the vehicle body 2. A bracket extending on an upper side of the tire 15 is integrated with the casing 6 of the driving unit 5, and the steering device 4 is mounted at an upper end of this bracket. As described above, the steering device 4 is configured to be capable of steering the wheel 3 to about 90 degrees or about 180 degrees. One example of this configuration is schematically shown in FIG. 3.

The steering device 4 has a tubular casing 17, and the casing 17 is mounted to the suspension arm 16 such that a central axis L of the casing 17 is oriented substantially in a vertical direction and passes through a center of rotation of the wheel 3. Inside the casing 17, a steering motor 18 and a speed reducing mechanism 19 are disposed one above the other on the central axis L so as to face downward.

The motor 18 may be any motor that can output torque required to steer the wheel 3. It is preferable that the motor 18 be a low-speed high-torque motor and, to reduce the unsprung mass, be a motor having as small a weight per unit output torque as possible. The speed reducing mechanism 19 is a mechanism that amplifies the torque output by the motor 18, and can be formed by a planetary gear mechanism as with the speed reducing mechanism 9 of the driving unit 5. In the example shown in FIG. 3, a sun gear 19S is coupled to an output shaft of the motor 18, a carrier 19C is coupled to a steering shaft 20, and a ring gear 19R is mounted to the casing 17. Moreover, the driving unit 5 is coupled to a lower surface of the casing 17 through a thrust bearing 21, and the steering shaft 20 is coupled to the driving unit 5.

Thus, the steering device 4 is configured such that, as the motor 18 rotates, the driving unit 5 rotates along with the steering shaft 20, causing the wheel 3 to rotate around the central axis L of the steering device 4 as the rotational central axis. Specifically, the center of steering of the wheel 3 is the central axis L, and the central axis L is set so as to pass through the center of rotation of the wheel 3, so that the wheel 3 rotates around the two axes, one being the central axis of the output shaft 8 of the driving unit 5 and the other being the central axis L of the steering device 4. Since the steering device 4 is a device that steers the wheel 3 to a target angle, it is preferable that the steering device 4 be provided with a sensor (not shown) that detects a steering angle and configured to control the rotation angle of the motor 18 or the driving unit 5 by using a detection angle of this sensor as a feedback signal.

The wheel 3 mounted to the driving unit 5 is located inside a wheelhouse 22 that is provided as part of the vehicle body 2. The wheelhouse 22 is a partition wall that separates a region where the wheel 3 is disposed and an inside of the vehicle body 2 from each other, and covers an outer circumferential side (especially an upper side) of the wheel 3. The wheelhouse 22 has such a size that the wheel 3 fits inside the wheelhouse 22 when the vehicle 1 performs a so-called normal travel of traveling in an arcuate line with two wheels of either the front wheels or the rear wheels steered, but that the wheel 3 partially protrudes from the vehicle body 2 toward an outer side when the wheel 3 is steered to an extent enough to perform a special travel, such as a lateral travel or an oblique travel.

The driving unit 5 is electrically connected to a driving power supply unit 23, and the steering device 4 is electrically connected to a steering power supply unit 24. The power supply units 23, 24 include electricity storage devices, such as batteries, and controllers, such as inverters or converters (none is shown). Alternatively, the power supply units 23, 24 may share a single electricity storage device. An electronic control unit (ECU) 25 that controls the driving unit 5 and the steering device 4 through the power supply units 23, 24 is provided.

The ECU 25 is configured with a microcomputer as a main component, and is configured to perform computations by using data input into the ECU 25 or data stored therein in advance and output the result of computations as a control command signal. For example, the ECU 25 controls driving torque of the motor 7 in the driving unit 5 based on an acceleration request, and controls regenerative torque of the motor 7 or braking force of the braking mechanism 10 in the driving unit 5 based on a braking request. With respect to the steering device 4, the ECU 25 controls steering of the wheels 3 according to a steering angle of a steering wheel 26, controls directional indication based on a signal output as a lever 27 provided on a steering column is manipulated, and controls steering of each wheel 3 to a direction and an angle different from the steering angle during a normal travel based on an output signal of a selection switch 28 intended for special travels.

The selection switch 28 may be a switch configured such that one of a lateral travel, an oblique travel with the angle thereof, and an on-the-spot rotation is selected by a single knob or lever, or may be switches provided for the respective forms of travel or behavior. In either case, the selection switch 28 is preferably a switch that outputs a signal by being manipulated by a driver. FIG. 1 shows an example of a configuration in which the form of travel or behavior is selected by a rotary selection switch 28. When the selection switch 28 is rotated 90 degrees leftward from a neutral position, a signal for a leftward lateral travel is output, and when the selection switch 28 is rotated 90 degrees rightward, a signal for a rightward lateral travel is output. When the selection switch 28 is rotated within the range of these angles, a signal that causes the vehicle 1 to travel obliquely in the direction of the angle selected by rotating the selection switch 28 is output. The selection switch 28 can also be pushed, and when the selection switch 28 is pushed, a signal for an on-the-spot rotation is output. In the case of a self-driving vehicle, the selection switch 28 may be a switch (a switch in a control program) that outputs a signal based on a result of determination by a self-driving system.

Here, examples of signals input from sensors (not shown) into the ECU 25 include: a steering angle of the steering wheel 26; a direction indicating signal output as the lever 27 is manipulated; a special steering signal from the selection switch 28; an accelerator operation amount showing a driving request; and a brake signal showing a braking request. Sensors that output these input signals to the ECU 25 can be regarded as the detection unit in the embodiment of the present disclosure.

In this embodiment of the present disclosure, steering the steering wheel 26 can steer, for example, the front wheels 3 according to the steering angle of the steering wheel 26 and thereby cause the vehicle 1 to turn. Steering of the front wheels 3 is controlled as the ECU 25 controls the steering angles to which the front wheels 3 are steered by the steering devices 4. In addition, steering the wheels 3 individually and to larger steering angles can cause the vehicle 1 to perform a special travel or exhibit a special behavior compared with those of common vehicles. The vehicle 1 includes a direction indication system that indicates toward those around the vehicle 1 (toward the outside of the vehicle body 2) that the vehicle 1 is going to perform such a so-called special travel. The direction indication system in this embodiment of the present disclosure is configured with the above-described detection unit and an indication unit to be described below as main components.

The indication unit is formed by a functional member that optically or acoustically displays or expresses a special travel of the vehicle 1 toward those around the vehicle 1. Examples of the indication unit include blinkers 29 that flash and brake lights 30 that are provided at a rear part of the vehicle body 2. Backup lights that go on when the vehicle 1 moves backward can also be included in the indication unit.

Figure 4:
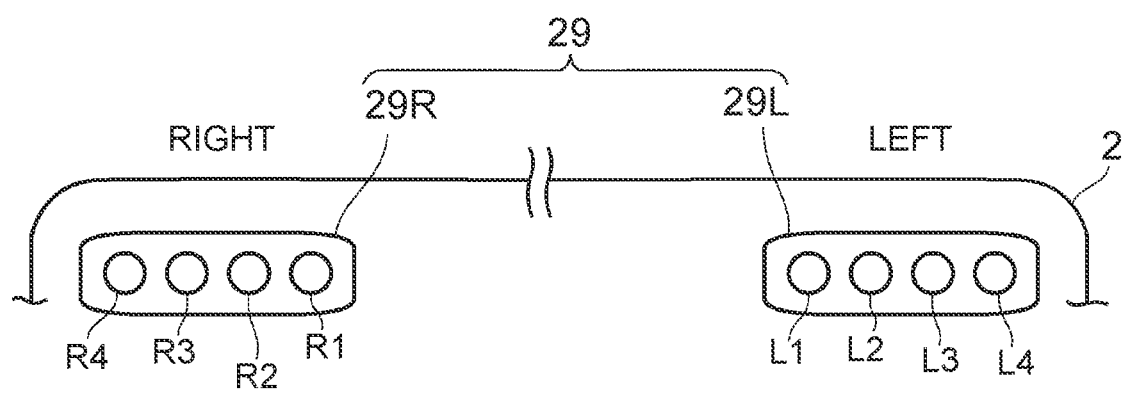
FIG. 4 is a view showing an example of the arrangement of LEDs in sequential blinkers.

The blinker 29 may be a blinker having a configuration in which a single light emitter flashes repeatedly, but is preferably a sequential blinker having a configuration in which a plurality of light emitters (LEDs) that is flashing parts is arranged in a line, such as a straight line or a curved line, and the order of flashing of these LEDs can be appropriately changed. The blinkers 29 are provided on right and left sides of a front surface of the vehicle body 2 and on right and left sides of a rear surface of the vehicle body 2. Flashing of the blinkers 29 is controlled by the ECU 25. FIG. 4 schematically shows an example of a configuration, as seen from the front side of the vehicle 1, in which a right blinker 29R and a left blinker 29L provided on a front surface side of the vehicle body 2 each have four LEDs arranged in a row in the vehicle width direction. The LEDs in the left and right blinkers 29L, 29R are arranged in the order of L1, L2, L3, L4 and R1, R2, R3, R4 from a central side toward an outer side in the vehicle width direction. In the case of a normal travel in which the steering wheel 26 is steered to turn the vehicle 1, when a command for a right turn is given by the lever 27, the LEDs of the right blinker 29R flash repeatedly by going on and off in the order of R1, R2, R3, R4 from the inner side toward the outer side in the vehicle width direction. When a command for a left turn is given by the lever 27, the LEDs of the left blinker 29L flash repeatedly by going on and off in the order of L1, L2, L3, L4 from the inner side toward the outer side in the vehicle width direction. The blinkers 29 provided at the rear part of the vehicle body 2 flash in the same manner. (A first aspect of flashing of the blinkers (29).)

Figure 5:
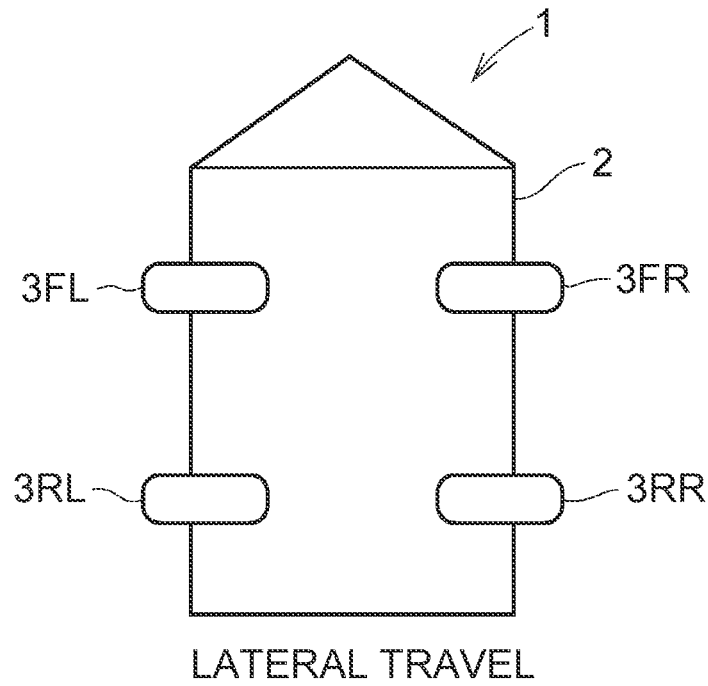
FIG. 5 is a view showing a state of steering of each wheel when the vehicle travels laterally.

Described below are examples of special travels, and control of indicating these special travels to those around the vehicle by using the blinkers 29 as the indication unit, in this embodiment of the present disclosure. When a rightward or leftward lateral travel is selected by the selection switch 28 as opposed to a so-called normal travel, a right front wheel 3FR and a left rear wheel 3RL are rotated 90 degrees leftward (in the counterclockwise direction), while a left front wheel 3FL and a right rear wheel 3RR are rotated 90 degrees rightward (in the clockwise direction). Here, the rotation direction is a rotation direction as seen in a top-down view of the vehicle body 2. This state is schematically shown in FIG. 5. When all the wheels 3FL, 3FR, 3RL, 3RR are driven in the same direction in this state, the vehicle 1 travels laterally rightward or leftward. The steering angle in this case can be regarded as the first steering angle in this embodiment of the present disclosure.

When the vehicle 1 is going to travel laterally rightward, the LEDs of the left blinker 29L go on in the order of L4, L3, L2, L1 from left to right, i.e., from the outer side toward the inner side, and subsequently the LEDs of the right blinker 29R go on in the order of R1, R2, R3, R4 from left to right, i.e., from the inner side toward the outer side. The LEDs having gone on go off in the same order in which these LEDs have gone on. Thus, as seen from the front side of the vehicle 1, all the LEDs go on and then go off sequentially from right to left. Similarly, when the vehicle 1 is going to travel laterally leftward, the LEDs of the right blinker 29R go on in the order of R4, R3, R2, R1 from right to left, i.e., from the outer side toward the inner side, and subsequently the LEDs of the left blinker 29L go on in the order of L1, L2, L3, L4 from right to left, i.e., from the inner side toward the outer side. The LEDs having gone on go off in the same order in which these LEDs have gone on. Thus, as seen from the front side of the vehicle 1, all the LEDs go on and then go off sequentially from left to right. (A second aspect of flashing of the blinkers (29).)

Thus, the aspect of flashing of the blinkers 29 when the vehicle 1 is going to travel laterally is different from that when the vehicle 1 is going to turn, and shows a direction. It is therefore possible to let the drivers of other vehicles or pedestrians around the vehicle 1 know about a lateral travel the vehicle 1 is going to perform and the direction thereof, and to allow them to recognize the situation as such.

Figure 6:
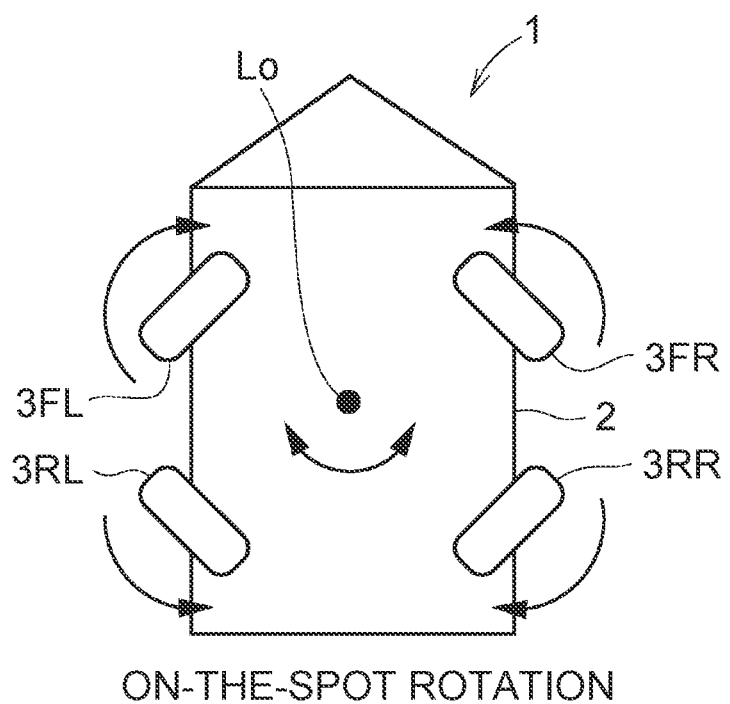
FIG. 6 is a view showing a state of steering of each wheel when the vehicle rotates on the spot.

When the selection switch 28 is pushed to cause the vehicle 1 to rotate on the spot, the right front wheel 3FR and the left rear wheel 3RL are rotated 45 degrees leftward, while the left front wheel 3FL and the right rear wheel 3RR are rotated 45 degrees rightward. The example being described here is an example in which all the four wheels are disposed at regular intervals on a circumference of a predetermined radius. This state is schematically shown in FIG. 6. When all the wheels 3FL, 3FR, 3RL, 3RR on the circumference are driven in the same direction in this state, the vehicle 1 rotates rightward or leftward around a vertical axis Lo passing through a central portion of the vehicle body 2. The steering angle in this case can be regarded as the second steering angle in this embodiment of the present disclosure.

When the vehicle 1 is going to perform such a so-called on-the-spot rotation, the LEDs of the right blinker 29R and the LEDs of the left blinker 29L go on and then go off at the same time sequentially from the inner side toward the outer side in the vehicle width direction. Or conversely, these LEDs go on and then go off sequentially from the outer side toward the inner side in the vehicle width direction. In the case of an on-the-spot rotation, the vehicle 1 does not move in any of the forward, backward, leftward and rightward directions, so that a form of display that allows for recognition of a direction need not be used. (The second aspect of flashing of the blinkers (29).)

Thus, the aspect of flashing of the blinkers 29 when the vehicle 1 is going to perform an on-the-spot rotation is different from that when the vehicle 1 is going to turn or that for showing a hazard state. It is therefore possible to let the drivers of other vehicles or pedestrians around the vehicle 1 know that the vehicle 1 is going to rotate on the spot, and to allow them to recognize the situation as such.

Figure 7:
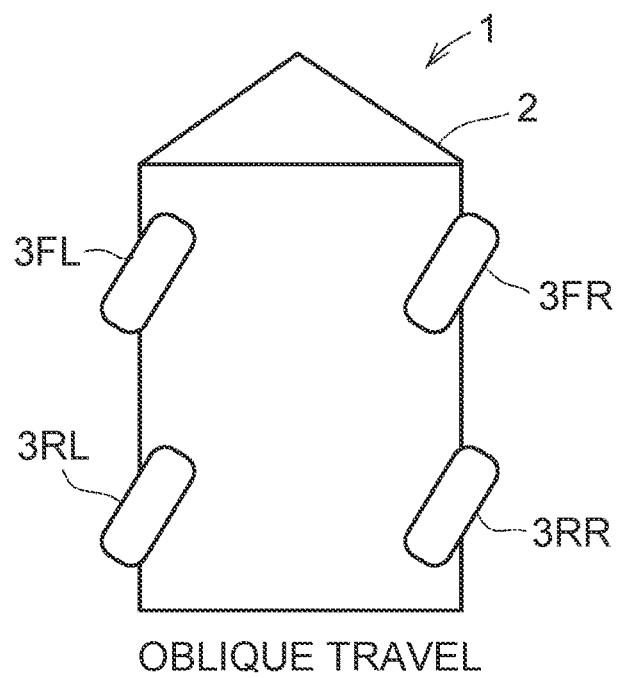
FIG. 7 is a view showing a state of steering of each wheel when the vehicle travels obliquely.

Moreover, when the selection switch 28 is rotated an angle smaller than 90 degrees from the neutral position to cause the vehicle 1 to travel obliquely, the four front and rear wheels 3FL, 3FR, 3RL, 3RR are rotated rightward or leftward according to the direction and the angle specified by the selection switch 28. This state is schematically shown in FIG. 7. When all the wheels 3FL, 3FR, 3RL, 3RR are driven in the same direction in this state, the vehicle 1 travels straight in the direction that the wheels 3FL, 3FR, 3RL, 3RR face. When this oblique travel is a rightward oblique travel, the two outer LEDs (R3, R4) of the right blinker 29R and the two inner LEDs (L1, L2) of the left blinker 29L flash, with the order of flashing being from left to right. When this oblique travel is a leftward oblique travel, the two outer LEDs (L3, L4) of the left blinker 29L and the two inner LEDs (R1, R2) of the right blinker 29R flash, with the order of flashing being from right to left. (The second aspect of flashing of the blinkers (29).) The steering angle in this case can be regarded as the first steering angle in this embodiment of the present disclosure.

Thus, the aspect of flashing of the blinkers 29 when the vehicle 1 is going to travel obliquely is different from that when the vehicle 1 is going to turn, and shows a direction. It is therefore possible to let the drivers of other vehicles or pedestrians around the vehicle 1 know about an oblique travel the vehicle 1 is going to perform and the direction thereof, and to allow them to recognize the situation as such.

Figure 8:
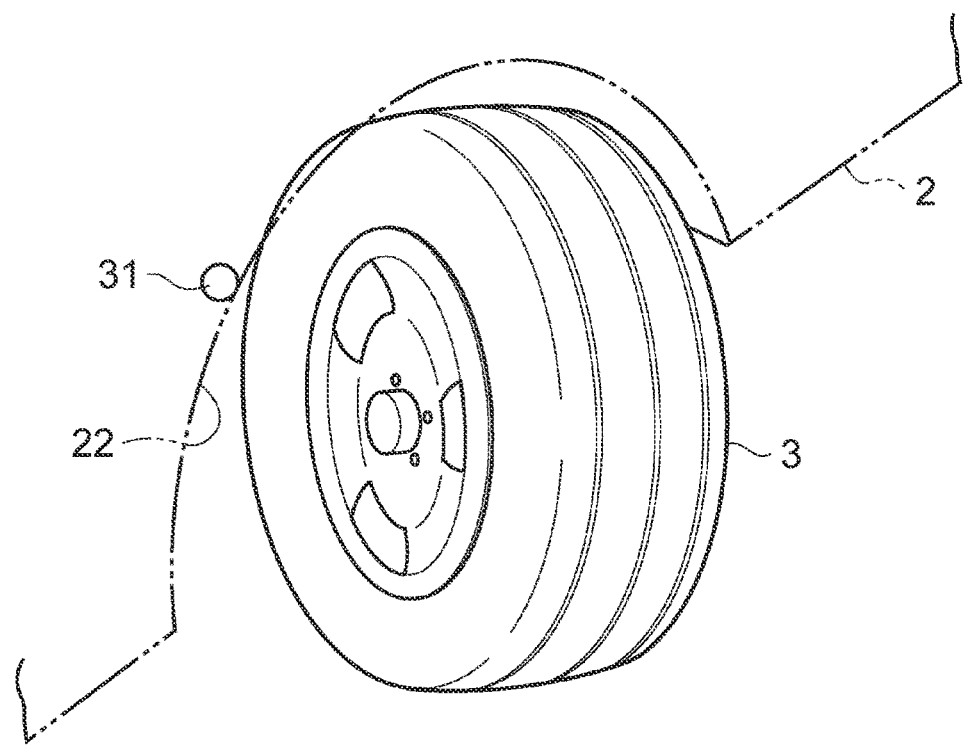
FIG. 8 is a partial perspective view schematically showing a state of the wheel protruding from a wheelhouse.

The indication unit in this embodiment of the present disclosure is not limited to the configuration using the blinkers 29. Another example of the indication unit is schematically shown in FIG. 8. The example shown here is an example of a configuration in which the direction of the wheel 3 is used to indicate that the wheel 3 is steered to a large angle and that therefore the vehicle 1 is going to perform a special travel, such as a lateral travel. Specifically, an LED lamp 31 as a light emitter that emits visible light is mounted inside the wheelhouse 22. The LED lamp 31 is configured to go on or flash when a rightward or leftward lateral travel or an oblique travel is selected by the selection switch 28, or when the rotation angle around the central axis L, i.e., the steering angle, of the wheel 3 becomes equal to or larger than a predetermined angle that is set in advance. The LED lamps 31 for all the four wheels may emit visible light to the wheels 3 by going on or flashing, or only the LED lamps 31 for those wheels 3 that are located in the direction of travel of the vehicle 1 may do so. The form of light emission of the LED lamp 31, such as the speed and the illuminance of flashing, may be different between the LED lamps 31 for the wheels 3 located on the front side in the direction of travel and the LED lamps 31 for the wheels 3 located on the rear side in the direction of travel. It is therefore possible to let the drivers of other vehicles or pedestrians around the vehicle 1 know that the vehicle 1 is going to travel laterally or obliquely or rotate on the spot by visually recognizing that the directions of the wheels 3 of the vehicle 1 are different from those in a normal travel.

When the vehicle 1 thus performs a so-called special travel, the wheel 3 may partially protrude from the wheelhouse 22. Thus, another configuration may be adopted in which a detection unit, such as a touch sensor, that detects that the wheel 3 has partially protruded from the wheelhouse 22 is provided, and the indication unit, such as the blinkers 29 or the LED lamps 31, is activated based on a signal from this detection unit.

The detection unit in this embodiment of the present disclosure is configured to output a signal upon detecting that some part of the vehicle 1 has shifted into a state for performing a so-called special travel. Therefore, the detection unit in this embodiment of the present disclosure can have an appropriate configuration as necessary. For example, other than the sensor that detects the steering angle to which the wheel 3 is steered by the steering device 4, the selection switch 28 as the manipulation unit, and the touch sensor provided in the wheelhouse 22, the detection unit may include a detector that processes an image of the wheel 3 and outputs a signal showing the steering state of the wheel 3. The indication unit in this embodiment of the present disclosure is not limited to the configuration that uses LEDs, such as the blinkers 29. The indication unit may be an image display (i.e., the display unit in this embodiment of the present disclosure), such as an overhead display, that displays images or texts on a liquid crystal panel or a glass provided on a surface of the vehicle body 2. Moreover, a configuration in which voice is used for indication other than these optical means, or a configuration combining optical means and acoustic means may be adopted.

How to steer the wheels 3 to cause the vehicle 1 to travel laterally or rotate on the spot will be described here. The vehicle 1 has the configuration in which each wheel 3 has two axes as rotational axes, and when steered, each wheel 3 is steered around a central portion of the wheel 3. Thus, the wheels 3 can be rotated in both the rightward and leftward directions as the steering directions. To cause the vehicle 1 to rotate on the spot, as described above, two wheels located on the same diagonal line are steered to the same angle rightward or leftward. For example, the right front wheel 3FR and the left rear wheel 3RL are steered to 45 degrees leftward, while the left front wheel 3FL and the right rear wheel 3RR are steered to 45 degrees rightward. Thus, the wheels 3 need to be steered only to a small angle, and therefore can be quickly set to a state that allows the vehicle 1 to rotate on the spot. Whether the wheels 3 have been thus brought into a state that allows for an on-the-spot rotation, in other words, whether conditions for starting to drive the wheels 3 to make an on-the-spot rotation have been met, can be determined by detecting that the steering angle of each wheel 3 reaches a predetermined angle (45 degrees in the above example).

On the other hand, to cause the vehicle 1 to travel laterally, each wheel 3 is steered to 90 degrees. In this case, all the wheels 3 may be rotated rightward or leftward as the steering direction, but it is preferable that the wheels 3 located next to each other in the front-rear direction or a right-left direction be steered in opposite directions. When the wheel 3 is steered, a reaction force acts on the vehicle body 2. Steering the wheels 3 located next to each other in opposite directions can cancel out the reaction forces of the wheels 3 and thereby reduce shaking of the vehicle body 2.

In both cases of an on-the-spot rotation and a lateral travel, whether steering of the wheels 3 has been completed, i.e., whether conditions for starting to drive the wheels 3 have been met, can be determined by detecting the steering angles of the wheels 3 by a predetermined angle sensor, or by detecting that the wheels 3 have protruded from the wheelhouses 22 with a touch sensor or by image processing. Steering of the wheels 3 for a special travel is performed with the vehicle 1 temporarily stopped.

What is claimed is:

1. A vehicle comprising:
   a plurality of wheels that is mounted to a vehicle body and grounded;
   a steering device configured to steer the wheels to such a steering angle that the vehicle travels straight in a front-rear direction of the vehicle, and additionally to steer the wheels at least either to such a first steering angle that the vehicle travels straight in a direction intersecting the front-rear direction or to such a second steering angle that the vehicle rotates around a vertical axis passing through a central portion of the vehicle body; and
   a direction indication system configured to, when the steering device steers the wheels to either the first steering angle or the second steering angle, indicate toward an outside of the vehicle body that the vehicle is going to travel straight in the direction intersecting the front-rear direction or that the vehicle is going to rotate around the vertical axis passing through the central portion of the vehicle body.

2. The vehicle according to claim 1, wherein the direction indication system includes a detection unit that detects that the steering device steers the wheels to the first steering angle or the second steering angle, and an indication unit that optically or acoustically indicates to those around the vehicle body that the vehicle is going to travel straight in the direction intersecting the front-rear direction or that the vehicle is going to rotate around the vertical axis passing through the central portion of the vehicle body.

3. The vehicle according to claim 2, wherein:
   the steering device is configured to rotate each of the wheels around a rotational central axis to the first steering angle or the second steering angle; and
   the detection unit is configured to detect that the wheels are steered to the first steering angle or the second steering angle, based on rotation angles of the wheels rotated around the rotational central axis.

4. The vehicle according to claim 2, further comprising a manipulation unit that is manipulated by a driver to output a signal ordering the steering device to steer the wheels to the first steering angle or the second steering angle, wherein the detection unit is configured to detect that the steering device steers the wheels to the first steering angle or the second steering angle, based on the manipulation unit having been manipulated and output the signal.

5. The vehicle according to claim 2, further comprising a wheelhouse that covers at least an upper side of the wheel, wherein:
   the wheelhouse is configured such that when the steering device steers the wheel to the first steering angle or the second steering angle, the wheel partially protrudes from the wheelhouse to the outside of the vehicle body; and
   the detection unit is configured to detect that the steering device steers the wheel to the first steering angle or the second steering angle, based on the wheel having partially protruded from the wheelhouse to the outside of the vehicle body.

6. The vehicle according to claim 2, wherein the indication unit includes a light emitter that emits visible light to the wheels when the detection unit has detected that the steering device steers the wheels to the first steering angle or the second steering angle.

7. The vehicle according to claim 2, wherein:
   the indication unit includes blinkers that are provided on right and left sides of the vehicle body and configured to flash when the vehicle is going to travel in a direction different from that when the vehicle travels straight forward; and
   the indication unit is configured to control the blinkers such that a first aspect of flashing of the blinkers when the vehicle is going to turn in an arcuate line around a center of turning that is set outside the vehicle body, and a second aspect of flashing of the blinkers when the vehicle is going to travel straight in the direction intersecting the front-rear direction or when the vehicle is going to rotate around the vertical axis passing through the central portion of the vehicle body, are different from each other.

8. The vehicle according to claim 7, wherein:
   the blinkers are sequential blinkers in each of which a plurality of flashing parts is arranged in a straight line or a curved line and the flashing parts flash in predetermined order; and
   the first aspect of flashing of the blinkers and the second aspect of flashing of the blinkers include order of flashing of the flashing parts.

9. The vehicle according to claim 2, wherein the indication unit includes a display part that displays, on an outer surface of the vehicle body, a text or an image representing a direction in which the vehicle is going to travel as a result of the steering device having steered the wheels to the first steering angle or the second steering angle.

* * * * *